(12) United States Patent
Zhang et al.

(10) Patent No.: US 7,630,356 B2
(45) Date of Patent: Dec. 8, 2009

(54) METHODS FOR SUPPORTING MIMO TRANSMISSION IN OFDM APPLICATIONS

(75) Inventors: Hang Zhang, Nepean (CA); Mo-Han Fong, L'Orignal (CA); Shalini Periyalwar, Nepean (CA); Peiying Zhu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 428 days.

(21) Appl. No.: 11/547,561

(22) PCT Filed: Apr. 5, 2005

(86) PCT No.: PCT/CA2005/000506

§ 371 (c)(1),
(2), (4) Date: Oct. 5, 2006

(87) PCT Pub. No.: WO2005/099290

PCT Pub. Date: Oct. 20, 2005

(65) Prior Publication Data
US 2007/0274253 A1   Nov. 29, 2007

Related U.S. Application Data

(60) Provisional application No. 60/559,016, filed on Apr. 5, 2004, provisional application No. 60/564,227, filed on Apr. 22, 2004, provisional application No. 60/564,228, filed on Apr. 22, 2004.

(51) Int. Cl.
*H04B 7/208* (2006.01)

(52) U.S. Cl. ............... 370/344; 370/203; 370/334; 370/343

(58) Field of Classification Search .......... 370/328–338
See application file for complete search history.

(56) References Cited

U.S. PATENT DOCUMENTS 6,430,148 B1 * 8/2002 Ring ................... 370/208
6,466,544 B1   10/2002 Sen et al.
7,095,709 B2 * 8/2006 Walton et al. ......... 370/208

(Continued)

FOREIGN PATENT DOCUMENTS

CA   2256429   10/1998

(Continued)

OTHER PUBLICATIONS

IEEE Std 802.16-2004: Alr Interface for Fixed Broadband Wireless Access Systems, Oct. 17, 2004, pp. 562-566.*

*Primary Examiner*—Ajit Patel
*Assistant Examiner*—Natasha Cosme
(74) *Attorney, Agent, or Firm*—Christopher & Weisberg, P.A.

(57) ABSTRACT

Aspects of the present invention provide MAC enhancements to support the PHY features of a MIMO-OFDMA framework. The MAC enhancements involve DL burst assignment to support adaptive MIMO transmission, UL burst assignment to support adaptive MIMO transmission, fast feedback channel operation to support wireless terminal dynamic feedback of MIMO mode selection, for example space time transmit diversity (STTD) or spatial multiplexing (SM), and/or permutation mode selection, for example diversity or adjacent subcarrier mode, dynamic CQICH allocation and deallocation and the use of CQICH_ID for DL burst allocation. One or more of these enhancements is included in a given implementation. Methods are also provided for implementing the MAC enhancements.

22 Claims, 9 Drawing Sheets

U.S. PATENT DOCUMENTS

| | | | |
|---|---|---|---|
| 7,266,087 B2* | 9/2007 | Wahl | 370/252 |
| 7,310,303 B2* | 12/2007 | Koo et al. | 370/206 |
| 2002/0122383 A1* | 9/2002 | Wu et al. | 370/210 |
| 2003/0031121 A1* | 2/2003 | Sudo | 370/203 |
| 2003/0050068 A1 | 3/2003 | Woxberg et al. | |
| 2004/0001429 A1 | 1/2004 | Ma et al. | |
| 2004/0179492 A1 | 9/2004 | Zhang et al. | |

FOREIGN PATENT DOCUMENTS

| | | |
|---|---|---|
| CA | 2387094 | 5/2001 |
| CA | 2392574 | 1/2004 |
| EP | 0841763 | 5/1998 |
| EP | 1379033 | 1/2004 |
| EP | 1392029 | 2/2004 |
| WO | WO 0079722 A1 | 12/2000 |
| WO | WO 0163775 | 8/2001 |
| WO | WO 0169859 | 9/2001 |
| WO | WO 03043251 A2 | 5/2003 |
| WO | WO 2004039011 A2 | 5/2004 |
| WO | WO 2004056029 | 7/2004 |

* cited by examiner

METHODS FOR SUPPORTING MIMO TRANSMISSION IN OFDM APPLICATIONS

RELATED APPLICATIONS

This application claims the benefit of PCT Application No. PCT/CA2005/000506 filed Apr. 5, 2005. This application claims the benefit of U.S. Provisional Patent Application No. 60/559,016 filed on Apr. 5, 2004, U.S. Provisional Patent Application No. 60/564,227 filed on Apr. 22, 2004 and U.S. Provisional Patent Application No. 60/564,228 filed on Apr. 22, 2004.

FIELD OF THE INVENTION

The invention relates to wireless transmission of information, in particular methods for controlling the transmission of data consistent with the benefits of both Multiple Input Multiple Output (MIMO) and Orthogonal Frequency Division Multiplexing (OFDM).

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such a high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems. Orthogonal frequency division multiple access (OFDMA) is a multiple access technology that utilizes OFDM techniques.

MIMO antenna systems axe also being considered for incorporation into Wireless MANs. MIMO systems use multiple transmitting and multiple receiving antennas for communication of information. MIMO antenna systems allow spatial diversity. Spatial diversity that takes advantage of transmitting data from multiple sources that have a known physical spacing.

Combining both OFDM and MIMO techniques provides a powerful technology for wireless broadband communication having advantages of both spatial diversity and frequency multiplexing. These attributes are especially useful in Non Line-of-Sight (NLOS) transmission scenarios that are encompassed by wireless MAN.

Responsibilities of the MAC layer of a network can involve forming a MAC protocol data unit (PDU) and scheduling multiple terminals within the network. Signaling in the MAC layer are used to tell the terminals when and/or where to look for information in a signal transmitted over the air interface.

Currently there are methodologies for dealing with particular aspects of wireless MAN, for example OFDMA communications. However, these methodologies do not deal with ways to incorporate the newer concepts of MIMO.

SUMMARY OF THE INVENTION

Aspects of the invention provide MAC enhancements to support the PHY features of a MIMO-OFDMA framework. The MAC enhancements involve DL burst assignment to support adaptive MIMO transmission, UL burst assignment to support adaptive MIMO transmission, fast feedback channel operation to support SS dynamic feedback of MIMO mode, for example STTD or SM mode selection, and permutation mode, for example diversity or adjacent subcarrier mode selection, and dynamic CQICH allocation and the use of CQICH_ID for DL burst allocation. One or more of these enhancements is included in a given implementation.

According to a first aspect of the present invention, there is provided a method for enabling downlink transmission in a MIMO enabled OFDM system from a base station to at least one wireless terminal, the method comprising: the base station transmitting to the at least one wireless terminal a total number of regions that contain information, the information in the regions to be subsequently transmitted; the base station transmitting to the at least one wireless terminal for each region of the total number of regions; a location of the region within the data frame expressed in terms of two dimensions; a diversity multiplexing format used for transmitting the information located in the region of the frame; a location in a third dimension of the region as one of a total number of layers; transmitting for each layer of the total number of layers a transmission profile and an identifier for identifying a connection between the base station and the at least one wireless terminal.

According to a second aspect of the present invention, there is provided a method for enabling uplink transmission in a MIMO enabled OFDM system from at least one wireless terminal to a base station, the method comprising: the base station transmitting to the at least one wireless terminal a total number of allocated regions to contain information to be transmitted by the at least one wireless terminal, the regions to be subsequently transmitted; for each allocated region; transmitting a transmission profile and an identifier for identifying a connection between the base station and the at least one wireless terminal; and transmitting a diversity multiplexing format used for transmitting the information located in the allocated region.

According to a third aspect of the present invention, there is provided a method for designating transmission parameters in a MIMO enabled OFDM communication system, the method comprising a base station transmitting to at least one wireless terminal; a logical mapping of subcarriers to sub-channels to be used during transmission of information in a data frame; a type of transmit diversity to be used during transmission of information in the data frame; and a diversity multiplexing format used for transmitting the information in the data frame.

According to a fourth aspect of the present invention, there is provided a method for allocating a feedback channel between a base station and a wireless terminal in a data frame, wherein the base station polls the wireless terminal, the method comprising a base station transmitting to the wireless terminal; a location of the feedback channel in the frame; and a type of feedback information the base station is requesting.

According to a fifth aspect of the present invention, there is provided a method for a wireless terminal to report MIMO mode and/or permutation mode setting to a base station, wherein the mode setting is located in a fast feedback channel uplink transmitted from the wireless terminal to the base station, the method comprising transmitting the mode setting in the form of an encoding scheme indication.

According to a sixth aspect of the present invention, there is provided a method for dynamically allocating a channel quality indication channel to at least one wireless terminal in a MIMO-OFDM system, the method comprising the base station transmitting to the at least one wireless terminal: an identification of a channel in a data frame in which the at least one wireless terminal can transmit feedback information to a base station; a location of the channel in the frame; a MIMO feedback cycle for transmitting feedback information pertaining to a transmission channel between a base station and the at least one wireless terminal.

According to a seventh aspect of the present invention, there is provided transmitter in an MIMO enabled OFDM communications system adapted to perform the method of any one of the preceding claims.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 1B—A schematic diagram of 4 antenna transmitter supporting MIMO-OFDM communication;

FIG. 1C—A schematic diagram of 4 antenna transmitter supporting MIMO-OFDM communication;

FIG. 1D—A schematic diagram of 4 antenna transmitter supporting MIMO-OFDM communication;

FIG. 1E—A schematic diagram of 4 antenna transmitter supporting MIMO-OFDM communication;

DETAILED DESCRIPTION OF THE PREFERRED EMBODIMENTS

In accordance with embodiments of the invention, MAC enhancements are provided to support the PRY features of a OFDMA framework. Within the same framework, SISO, MISO, MIMO capable users can also be supported.

By way of overview, each user using OFDM framework for transmitting information can be mapped onto a different OFDM resource which might be a sub-channel, e.g. the AMC sub-channel and/or a diversity sub-channel. For MIMO users, preferably, multiple different space-time coding schemes are supported such as SM (spatial multiplexing) and STTD (space-time transmit diversity).

On a continuous basis, there is a stream of OFDM symbols associated with each transmit antenna. Each user may be first mapped onto one or multiple OFDM symbols and each OFDM symbol may then be mapped onto its associated antenna. Such mapping also allows per-antenna rate control (PARC) to be performed in some embodiments.

Each OFDM symbol may be mapped onto its associated antenna in the sub-carrier domain. For certain sub-carriers, if no specific user data is mapped, then a null assignment to such sub-carrier maybe fed into the corresponding antenna.

Figure 1A:
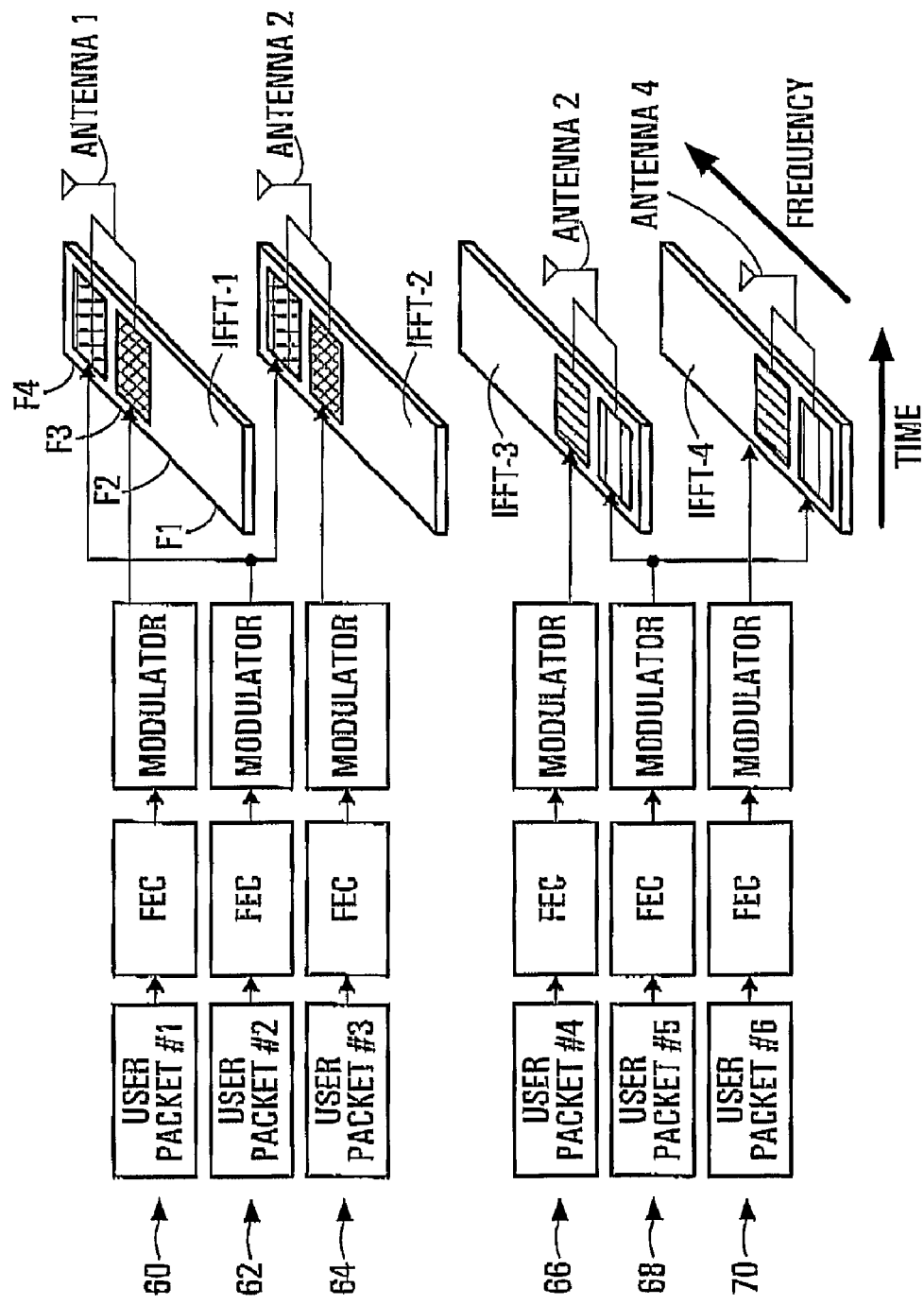
FIG. 1A—A schematic diagram of 4 antenna transmitter supporting MIMO-OFDM communication.

A very simple example of what might be transmitted at a specific instant in time as a result of a particular OFDM symbol and antenna mapping is shown in FIG. 1A. FIG. 1A shows a four antenna transmit system that, in the instance depicted, is being used to transmit six user packets 60, 62, 64, 66, 68, 70 each of which undergoes FEC (forward error correction) and modulation. A specific mapping of the six packets of six users is shown for a particular time instant. Over time, the number of users, and/or the manner in which the user packets are mapped are preferably dynamically changing.

For the particular time instant, the OFDM bandwidth is allocated in four distinct frequency bands F1, F2, F3, F4. These might for example be considered AMC sub-channels. A similar approach can be employed for diversity sub-channels.

Each packet is to be mapped onto the four antennas using a selected mapping scheme. In some embodiments, multiple different schemes are available or a given number of transmit antennas and receive antennas. For example, for a 2×2 system, preferably STTD or SM (BLAST—Bell Labs Layer Space Time) can be selected. In other embodiments only a single scheme is implemented for each antenna permutation. Single antenna users use a single input single output (SISO) (which may involve PARC—Per-antenna rate control) transmission scheme.

The first packet 60 is transmitted using only antenna 1 on band F3 implying a 1×1 SISO transmission.

The second packet 62 is transmitted on both antennas 1 and 2 in band F4 implying a 2×2, 2×2 or 2×4 MIMO transmission.

The third packet 64 is transmitted only on antenna 2 in band F3, again implying a 1×1 SISO transmission.

The fourth packet 66 is transmitted on band F2 over antenna 3.

The fifth packet 68 is transmitted on band F1 on both of antennas 3 and 4.

Finally, packet 70 is transmitted on only band F2 of antenna 4.

Generally, each packet can be mapped individually to some or all of the antennas. This enables MIMO and non-MIMO users to be mixed. In the above example, packets 60, 64, 66 and 70 are for non-MIMO users. Packets 62 and 64 are for MIMO users.

Please note that the flexible mapping of MIMO and non-MIMO users is applied both in the context of "partial utilization" and "full utilization". With partial utilization, a given base station only has access to part of the overall OFDM band. In this case, the sub-bands F1, F2, F3, F4 defined for the example of FIG. 1A would fall within the defined part of the overall band. With partial utilization, different base stations that are geographically proximate may be assigned different bands. With full utilization, each base station uses the entire OFDM band. With such an implementation, for the particular example of FIG. 1A the sub-bands F1, F2, F3, F4 would map to the entire band.

For SISO users, a single band on a single antenna will be used. For a MIMO user the configuration is denoted as $N_T \times N_R$.

The flexible structure illustrated by way of example in FIG. 1A can be used for both STTD and BLAST. For example, the packet 62 may be transmitted using the band F4 on antennas 1 and 2 using either BLAST or STTD.

The particular example shown in FIG. 1A is designed to show the co-existence of SISO and MIMO be it STTD and/or BLAST. Of course the number of sub-bands, and their shape, size, location, etc., within the OFDM band are implementation specific details. The mapping can be done on a per OFDM symbol basis, or for multiple OFDM symbols.

Details of a method of performing transmitting from a plurality of antennas are defined in applicants' co-pending application no. PCT/CA2005/000507 entitled Wireless Communication Method, System, and Signal Structure hereby incorporated by reference in its entirety. The method generally involves:

dividing an available OFDM bandwidth of each antenna into sub-channels;

defining a plurality of regions, each region being defined by a respective set of sub-channels and a defined number of OFDM symbols;

defining a respective antenna mapping for each region and selecting one or more of the plurality of antennas to use for the region, the antenna mappings including at least one MIMO mapping;

mapping content for at least one user to each of the regions using the respective antenna mapping;

transmitting each region on the one or more antennas selected for the region.

Details of a method of performing the content mapping are further defined in applicants' co-pending application no. PCT/CA2005/000504 entitled "Space-Time Transmit Diversity Systems and Methods for OFDM Applications" and filed Apr. 4, 2005, hereby incorporated by reference in its entirety.

Another way to think of this is that each time-frequency block that is defined can have its own matrix. Once the matrix is specified, the number of antennas at the output is defined. For example, a 2×2 matrix requires two antennas; a 4×4 matrix requires four antennas. The matrix also determines, not necessarily uniquely, the number of different users that can be mapped.

The content for multiple users of course needs to be mapped in a manner that is consistent and non-conflicting. Also, each user needs to be informed of where/when its content will be transmitted.

For each individual user, the antenna mapping enables STTD, SM and PARC transmissions for either the AMC sub-channel or the diversity sub-channel. In one embodiment, any one of six different mapping configurations can be applied to each individual user there including three 4-transmit antenna mappings, 2-transmit antenna mappings and a single antenna mapping.

The uplink may include, for example, two modes: (1) STTD for dual transmit antenna capable SS and (2) Virtual-MIMO for single transmit antenna capable SS.

Referring now to FIGS. 1B, 1C, 1D and 1E shown are specific transmitter configurations. In a preferred embodiment, the transmitter is dynamically reconfigurable to enable transmission to multiple users using respective transmission formats. The particular examples of FIGS. 1B, 1C, 1D, and 1E below can be considered "snapshots" of such a reconfigurable transmitter. These configurations can also exist simultaneously for different sub-bands of an overall OFDM band that is being employed. For example, the configuration of FIG. 1B might be used for a first set of sub-channels or a first OFDM band and associated user(s); the configuration of FIG. 1C might be used for a second set of sub-channels or a second OFDM band and associated user(s) and so on. Of course, many of the components that are shown as being replicated would not need to be physically replicated. For example, a single IFFT and associated transmit circuitry can be used per antenna with the different mappings being performed and then input to appropriate sub-carriers of the IFFT.

Figure 1B:
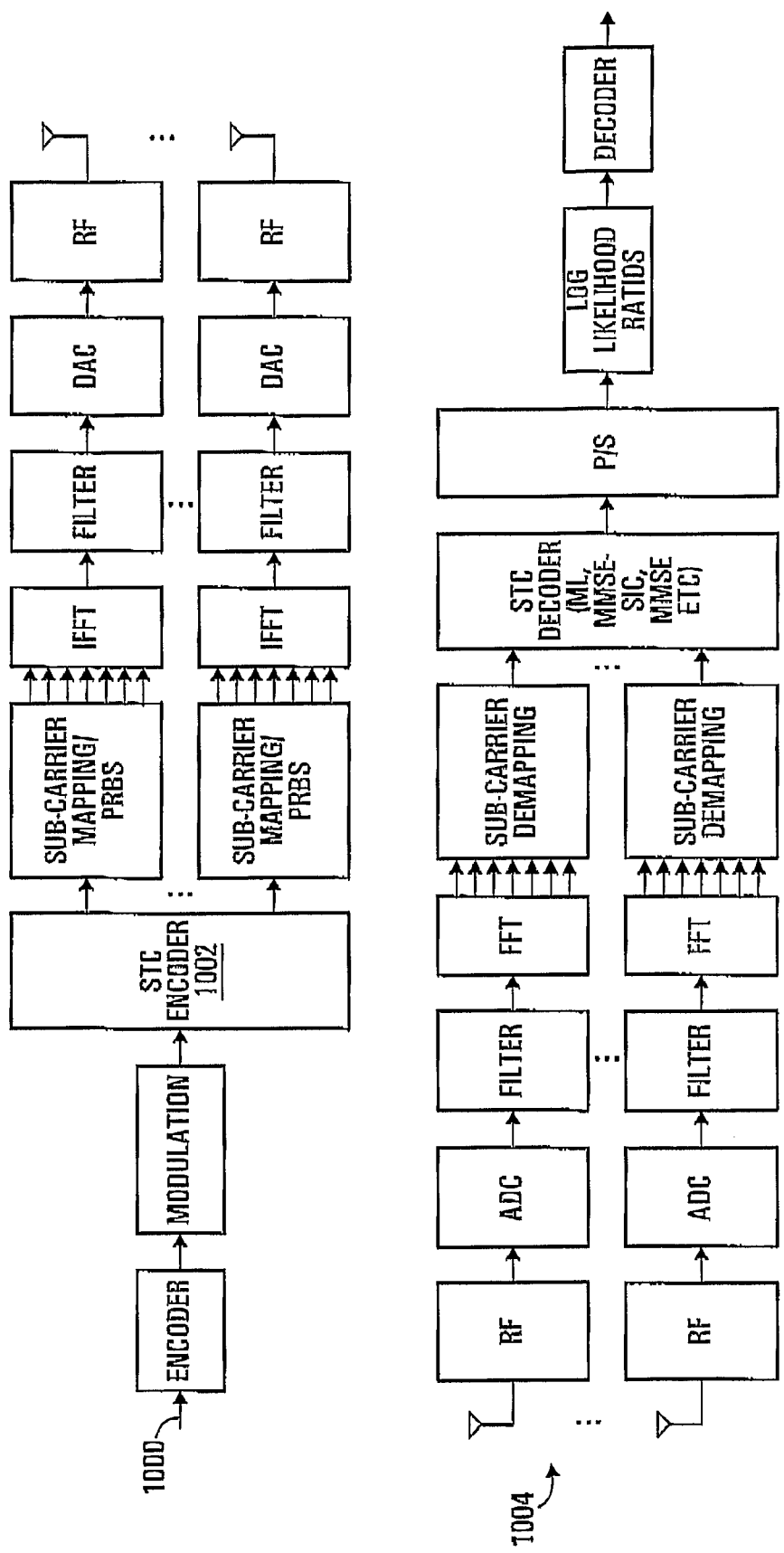

FIG. 1B shows an example configuration with a matrix that performs STTD encoding based on a single input stream, and with horizontal encoding for two, three or four transmit antennas. An input stream 1000 is encoded and modulated and then STC encoded in space time encoder 1002 having two, three or four outputs that are then fed to respective transmit chains and transmitted. A corresponding receiver structure is indicated generally at 1004. In this case, matrix $F_{4\times1}$ or $F_{4\times2}$ defined below can be used for four transmit antennas, depending upon receiver capabilities, or $F_{2\times1}$ defined below can be used for two transmit antennas. These are all STTD matrices, that might for example be employed; other matrices are possible.

Figure 1C:
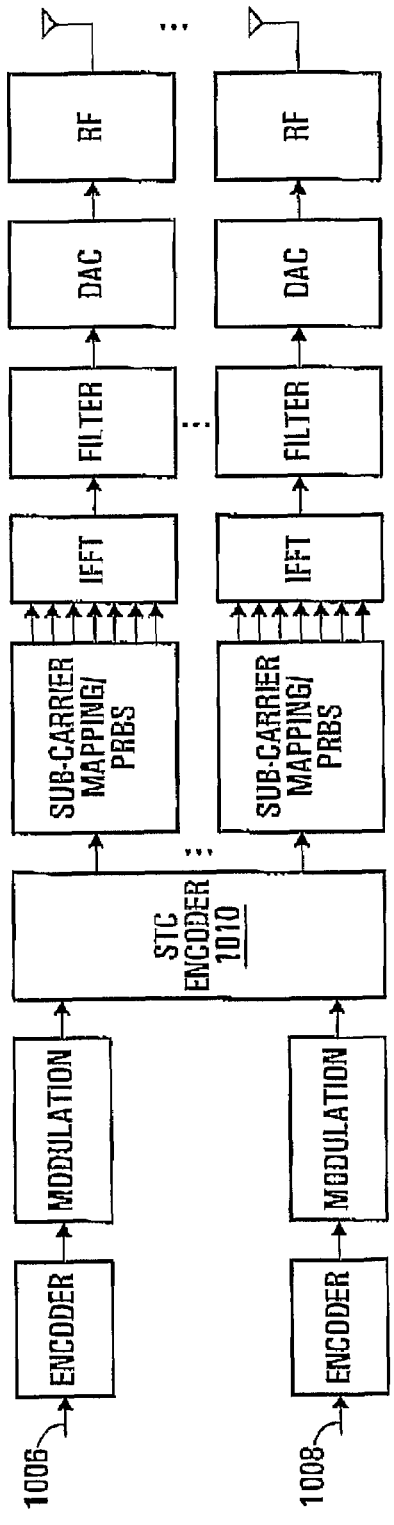

FIG. 1C shows an example configuration with a matrix that performs STTD encoding for multiple input streams, and with horizontal encoding for two, three or four transmit antennas. Input streams 1006, 1008 (only two shown, more possible) are encoded and modulated and then STC encoded in space time encoder 1010 having two, three or four outputs that are then fed to respective transmit chains and transmitted. In this case, matrix $F_{4\times1}$ or $F_{4\times2}$ defined below can be used for four transmit antennas, depending upon receiver capabilities, or $F_{2\times1}$ defined below can be used for two transmit antennas. These are all STTD matrices, that might for example be employed; other matrices are possible.

Figure 1D:
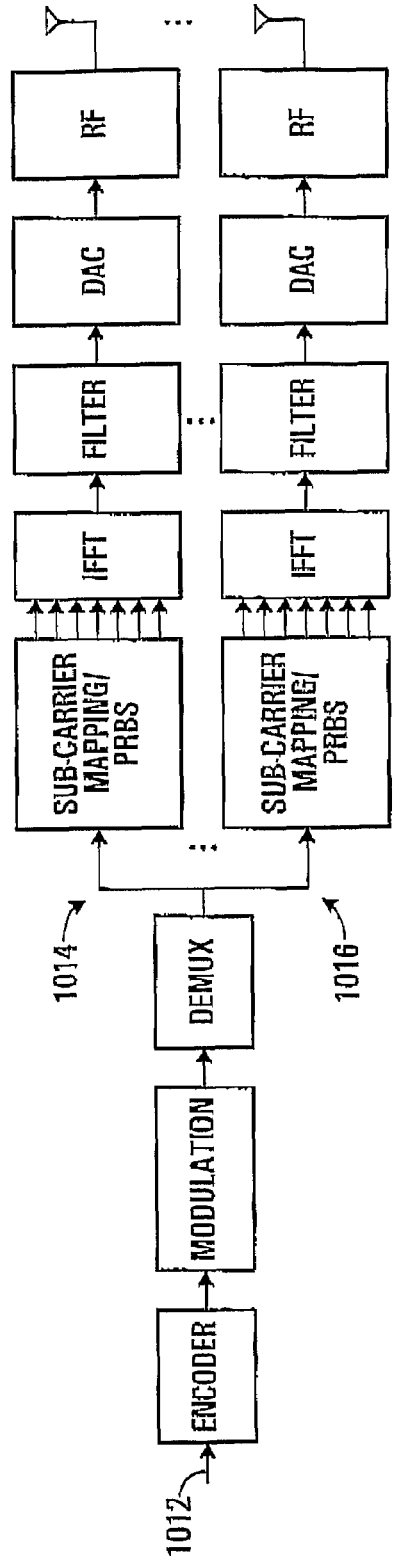

FIG. 1D shows an example configuration with a matrix that performs SM (e.g. BLAST) encoding for a single input stream. Input stream 1012 is encoded and modulated and then demultiplexed into two, three or four streams 1012, 1014 that are fed to respective transmit chains and transmitted. In this case, matrix $F_{4\times4}$ might be used for four transmit antennas or $F_{2\times2,2\times4}$ for two transmit antennas, both defined below, both of which are SM matrices, that might for example be employed; other matrices are possible. This is an example of so-called "vertical encoding" where the input symbols of a given input stream are vertically distributed (i.e. simultaneous in time) between the multiple antennas.

Figure 1E:
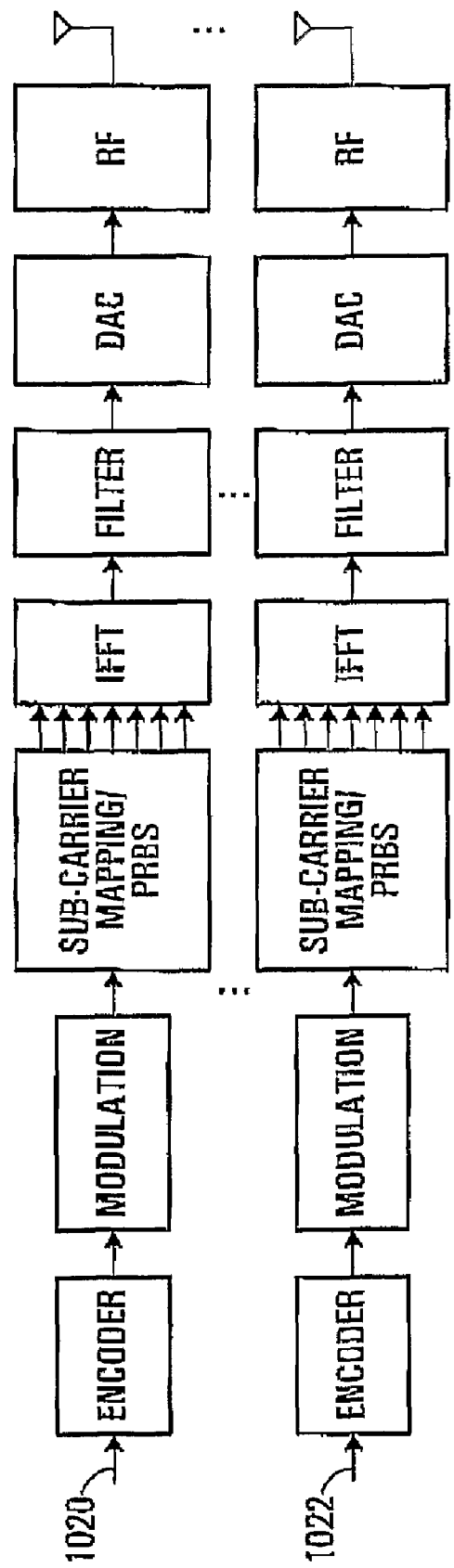

FIG. 1E shows an example configuration with a matrix that performs SM (e.g. BLAST) encoding for multiple input streams. Input streams 1020, 1022 (only two shown, more possible) are encoded and modulated fed to respective transmit chains and transmitted. In this case, matrix $F_{4\times4}$ might be used for four transmit antennas or $F_{2\times2,2\times4}$ for two transmit antennas, both defined below, both of which are SM matrices, that might for example be employed; other matrices are possible. This is an example of so-called "horizontal encoding" where the input symbols of a given input stream are horizontally distributed (i.e. sequentially in time) on a single antenna.

The MAC layer is used to enable features in the physical (PHY) layer in an OFDMA air interface framework. Frames are a format used to transmit data over the air interface between base stations (BS) and a wireless terminal, in some cases the wireless terminal being a subscriber station (SS). A subscriber station is for example any known wireless device such as a cellular telephone, computer with a wireless modem, or PDA. While subscriber station denotes a device subscribing to a service, it is to be understood that the more general wireless terminal may not be a subscriber to any services. Mapping information elements (IE) are included in the frame to provide a structure within the frame for defining where downlink and uplink information are located within the frame.

Figure 2:
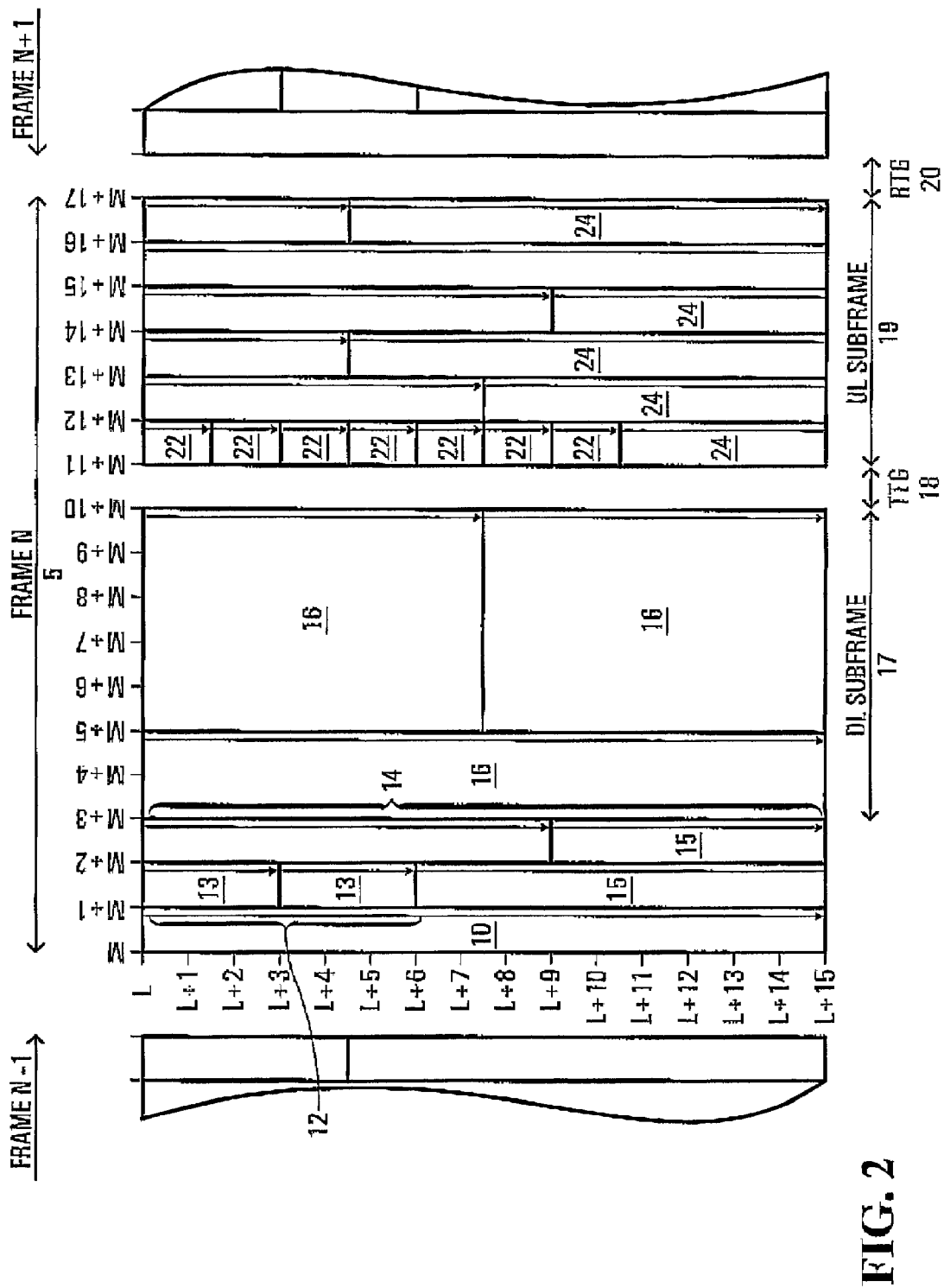
FIG. 2—A schematic view of an OFDMA frame for use with embodiments provided by the invention.

FIG. 2 shows a schematic diagram of an example frame used in conjunction with embodiments of the invention. The frame has a two dimensional appearance which is represented in terms of a rows and columns. The rows are designated by logical subchannel numbers L, L+1, . . . L+15 and the columns are designated by OFDMA symbol numbers M, M+1, . . . M+15. Logical subchannels are designated groupings of active subcarriers. Active subcarriers are any one of data subcarriers for data transmission, pilot subcarriers for synchronization, or subcarriers that do not involve direct transmission, but are used as transition guards between parts of the frame. In the frame N of FIG. 2, a preamble 10 is included in a first OFDMA symbol M. A second OFDMA symbol M+1 includes both a downlink (DL) mapping component 12 including one or more information elements 13 and an uplink (UL) mapping component 14 including one or more information elements 15. Other broadcast messages (not shown) may be included as well. Subsequent OFDMA symbols contain a DL subframe 17. The DL subframe 17 contains DL information allocated to regions 16 of the DL subframe 17 to be transmitted to one or more subscriber stations. Following the DL subframe 17 is a transmit/receive/transition guard (TTG) 18. After the TTG 18 is a UL subframe 19 containing UL information allocated to designated regions 24 of the UL subframe to be transmitted back to the base station (BS). The UL subframe 19 also includes fast feedback channels 22 that are used to allow the SS to report information to the BS, for example a fast feedback channel 22 can be designated as a channel to indicate the air interface channel quality between the BS and the SS. Following the UL subframe 19 in a receive/transmit transition guard (RTG) 20. Frames N-1 and N+1 have a similar composition.

Existing IEs used in OFDMA wireless transmission are not conducive for operation in MIMO-OFDMA systems. In conventional OFDMA wireless transmission, regions 16 in the frame are designated by only two dimensional attributes, those of time and frequency or logical subchannel numbers and OFDMA symbol numbers. Without the use of multiple antennas, as provided by MIMO, there is no spatial diversity. The addition of spatial diversity permits different types of space time coding (STC) techniques, which in turn enables multiple layers of two dimensional data. The layers are different coding streams. As such, MIMO allows for a three dimensional representation of information to be transmitted. Regions 16 allocated to contain information are represented in time and frequency or logical subchannel numbers and OFDMA symbol numbers as shown in the two dimensional representation of FIG. 2, however each region 16 may have multiple layers, adding additional bandwidth to transmission between the BS and one or more SS. It is important to provide proper identification of the location of the information to be transmitted in the one or tore layers of each region. The identification of the location of the information is included in a DL mapping IE.

DL Burst Assignment to Support Adaptive MIMO Transmission

In some embodiments of the invention, an IE 13 of the DL mapping component 12 is a DL mapping IE. The DL mapping IE firstly defines a number of regions 16 to be included in the mapping. Then, for each region 16 the mapping IE defines the location of the information. For example, defining a starting location in the region 16 in terms of coordinates comprising a first dimensional coordinate and a second dimensional coordinate, for example an OFDMA symbol offset and a subchannel offset. The offset values provide a relative location from a known starting location. In some embodiments, the region 16 is further defined by a number of OFDMA symbols and a number of subchannels that the region 16 occupies. These two pieces of positional information in combination provide an ability to know the size of the region 16.

For each region 16, a diversity multiplexing format is defined for transmission of the information in the region 16. As well for each region, a third dimension is defined in which information to be transmitted is accessed as one of a number of layers.

In some embodiments of the DL mapping component 12, to support an adaptive MIMO mode that is capable of different types of diversity multiplexing or space time coding (STC), for example space time transmit diversity (STTD) and spatial multiplexing (SM), an information element is provided to indicate when switching occurs between STTD and SM. This type of IE may be advantageous for identifying a similar MIMO mode for all regions in a given frame. In some embodiments, the instructions of the switching IE can be overridden on a per-assignment basis if so instructed in a "MIMO DL Basic" IE that will be described below. Table 1 defines a syntax structure of an embodiment of a Transmit Diversity (TD)/Zone switch information element, for example identified as "TD Zone" IE.

In some embodiments, in the DL mapping component 12, a MIMO-enabled BS transmits a downlink interval usage code (DIUC) equal to a predefined value, for example equal to 15, along with the "TD Zone" IE to indicate that the subsequent allocations use a specific permutation and/or transmit diversity encoding. The DIUC is a code value used for defining transmission characteristics of a signal, for example defining characteristics such as the code rate and or modulation type. The predefined value described above is predefined to indicate a MIMO-enable system.

In some embodiments, the DL frame has a default permutation mode setting and a default transmit diversity mode setting, for example a partially used subchannelization (PUSC) permutation mode and no transmit diversity. Allocations subsequent to this IE use the permutation and/or transmit diversity mode the IE instructs.

TABLE 1

Transmit diversity (TD)/Zone switch IE

| Syntax | Size | Notes |
|---|---|---|
| TD Zone IE ( )  { | | |
|   Extended DIUC | 4 bits | TD/Zone = 0x01 |
|   Length | 4 bits | Length = 0x02 |
|   Permutation | 2 bits | 00 = PUSC permutation |
| | | 01 = FUSC permutation |
| | | 10 = Optional FUSC permutation |
| | | 11 = Reserved |
|   Use All SC Indicator | 1 bit | 0 = Do not use all subchannels |
| | | 1 = Use all subchannels |
|   Transmit Diversity | 2 bits | 00 = No transmit diversity |
| | | 01 = STC using 2 antennas |
| | | 10 = STC using 4 antennas |
| | | 11 = FHDC |
|   Matrix Indicator | 3 bits | STC matrix |
| | | 000 = Matrix A |
| | | 001 = Matrix B |
| | | 010 = Matrix C |
| | | 011 = Matrix D |
| | | 100 = Matrix E |
| | | 101-111 = Reserved |
|   IDcell | 6 bits | |
|   Reserved | 2 bits | |
| } | | |

An Extended DIUC is another grouping of code values. The "Extended DIUC" field is used to associate a code value to identify a particular type of IE. For example, the "TD Zone" IE in Table 1 has an "Extended DIUC"=01. Other IE described below are indicated to have different respective Extended DIUC values. The values provided in Table 1 or subsequent tables below are mere examples of code values that could be used and it is to be understood that the code values assigned, and the number of bits used to represent the codes values could be varied according to a desired usage.

In the above syntax, the "Permutation" field indicates the particular permutation that is used by a BS transmitter for allocations following the IE. Permutation changes are only allowed at a zone boundary. The "Idcell" indicated by the IE is used as the basis of the permutation.

A permutation is a particular mapping of subcarriers into logical subchannels Table 1 identifies three different types of permutations that are commonly known, such as PUSC, fully used subchannelization (FUSC), and optional FUSC. PUSC utilizes a permutation in which full channel diversity is employed by distributing the allocated subcarriers to subchannels, but the subchannels are not fully utilized. FUSC utilizes a permutation in which full channel diversity is employed by distributing the allocated subcarriers to subchannels in which all of the subchannels are fully utilized. Optional FUSC is a variation of FUSC that uses more subcarriers and thus requires a slightly different mapping. The use of other permutation modes is also considered to be within the scope of the invention, for example adjacent subcarrier permutation.

The "Use All SC indicator" field, when set to 1 indicates transmission on all available subchannels. When the FUSC permutation is selected in the "Permutation" field, transmission is always on all subchannels.

The "Transmit Diversity" field indicates a transmit diversity mode used by the transmitter for allocations following the IE. Allocations without transmit diversity are transmitted only from one antenna. The BS transmitter transmits from two or more antennas for all allocations with transmit diversity.

The "Matrix indicator" field defines the diversity multiplexing format. In some embodiments, the diversity multiplexing format is defined by an indicator for indicating a predefined matrix transmission format.

The values in the "Size" column of Table 1 refer to a number of bits used to represent the element of each respective field. It is to be understood that these values are but one example for each respective field. In some embodiments, the number of bits can be greater or less than what is represented in Table 1. For example, the number of bits in any of the fields may be desired to be less than the values represented above to reduce an overall IE size, and therefore reduces an overall overhead of the frame. Conversely, the number of bits in any of the fields may be greater than the values represented above at an acceptable cost of increasing the overall overhead of the frame.

The binary values in the "notes" column of Table 1 for the "Permutation", "Transmit Diversity" and "Matrix Indicator" fields are associated with particular selectable options related to those fields. It is to be understood that each particular binary value is but one example for each particular option and a particular option can be represented by any appropriate binary value having any reasonable number of bits. In some embodiments, the number of bits can be greater or less than what is represented in Table 1, if there are greater than or less than the number of options identified specifically in Table 1. Furthermore, it is to be understood that the invention is not limited to the options identified in the table. For example, related to the "Transmit Diversity" field if there is an option where a antennas can be used, then at least three bits would be required for the field and "100" may be used for the 8 antenna option. In a situation where there is a desire to further define particular STC codes for 2 or 4 antennas then again more options could be identified.

Figure 3:
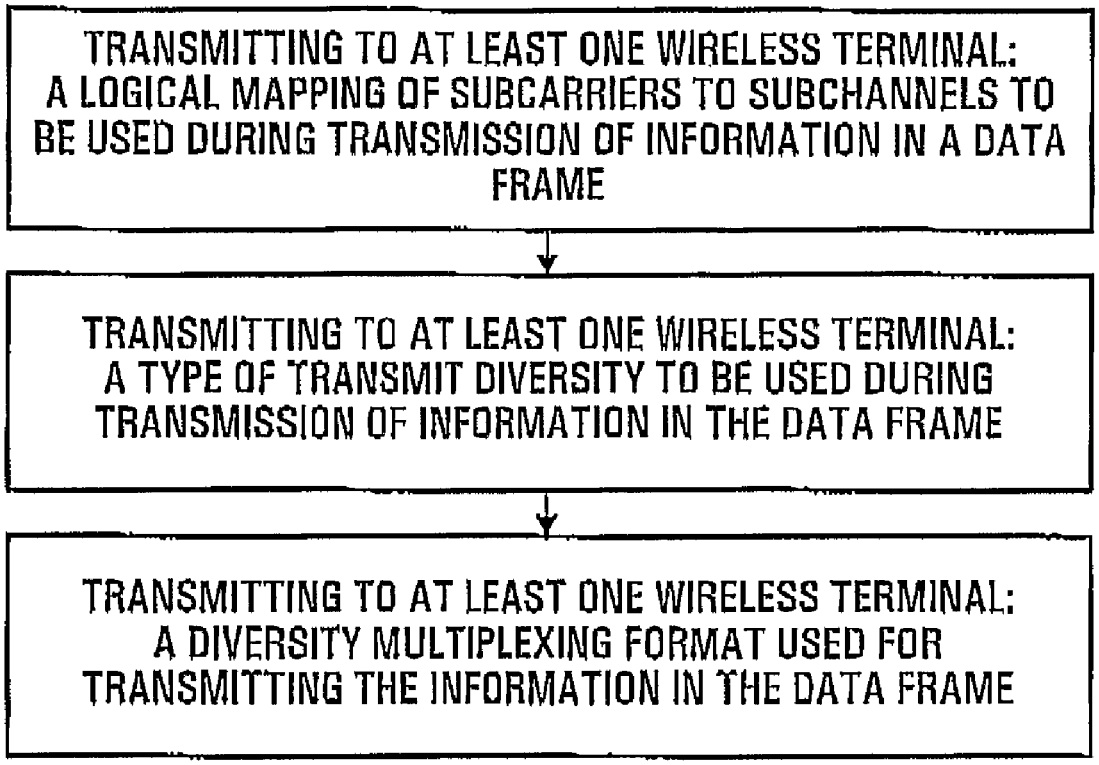
FIG. 3—A flow chart for enabling transmission of downlink information from a base station to a wireless terminal according to one embodiment of the invention.

Generally speaking, the "TD Zone" IE supports a method as shown in the flow chart of FIG. 3 for designating transmission parameters in a MIMO enabled OFDM communication system. The method comprises the base station transmitting to at least one wireless terminal 1) a logical mapping of subcarriers to subchannels (permutation) to be used during transmission of information in a data frame, 2) a type of transmit diversity to be used during transmission of information in the data frame, and 3) a diversity multiplexing format used for transmitting the information in the data frame.

Table 2 includes an example of a syntax structure for an information element, identified as a "MIMO DL Basic" IE, which is used to assign an STC matrix format for each region in a frame to be down link transmitted, indicate usage of a third dimension in the region for multiple coding streams or layers, and assign a PHY profile, in the form of a DIUC and connection identification (CID) on a per layer basis for MIMO operation.

In the "MIMO DL Basic" IE, a MIMO-enabled BS transmits DIUC equal to a predefined value, for example equal to 15, within the "MIMO DL Basic" IE structure to indicate the MIMO mode of the subsequent downlink allocation to a specific MIMO-enabled SS CID. In some embodiments the MIMO mode indicated in the "MIMO DL Basic" IE only applies to subsequent downlink allocations until the end of frame.

TABLE 2

MIMO DL Basic IE

| Syntax | Size | Notes |
| --- | --- | --- |
| MIMO DL Basic IE ( ) { | | |
|   Extended DIUC | 4 bits | 0x05 |
|   Length | 8 bits | Length in bytes |
|   Num Region | 4 bits | |
|   for ( i = 0; i< Num | | |
| Region; i++) { | | |
|     OFDMA Symbol offset | 10 bits | |
|     Subchannel offset | 5 bits | |
|     Boosting | 3 bits | |
|     No. OFDMA Symbols | 9 bits | |
|     No. subchannels | 5 bits | |
|     Matrix indicator | 3 bits | STC matrix |
| | | 000 = Matrix A |
| | | 001 = Matrix B |
| | | 010 = Matrix C |
| | | 011 = Matrix D |
| | | 100 = Matrix E |
| | | 101-111 = Reserved |
|     Num layer | 2 bits | |
|     for (j = 0; j< Num | | |
| layer; j++) { | | |
|       if (INC CID == 1) | | |
| { | | |
|         CID | 16 bits | |
|       } | | |
|       Layer index | 2 bits | |
|       DIUC | 4 bits | 0-11 burst profiles |
|   } | | |
| } | | |

The "Num Region" field indicates a number of different regions 16, as shown in FIG. 2, defined by the IE. For each region 16, the "OFDMA Symbol offset" and "Subchannel offset" fields of Table 2 define the starting point location of the region within the frame. The offsets are relative to a known initial position. The "Boosting" field indicates an amount of signal boost applied to pilot subcarriers, as compared to data subcarriers, in the respective region 16 when transmitted. The "No. of OFDMA Symbols" and "No. Subchannels" fields define the extent of the respective region from the starting point identified above. The "Matrix indicator" field defines the type of space time coded (STC) matrix format used to transmit the information in the region. As described above, a particular selection of matrix in the "Matrix indicator" field of the "MIMO DL Basic" IE in some embodiments overrides the "Transmit Diversity" field in the "TD Zone" IE.

For each region, the "Num Layer" field indicates the number of MIMO transmission layers in the region. "INC CID" is an indicator (1 bit) to indicate whether a CID is included in the IE. If set to '1', then the CID field is included. The "Layer index" field specifies the particular layer index for the CID. A CID is included for each layer. This may include a different CD for each layer, or one CID may be assigned to multiple layers. The DIUC is also defined for each layer.

The "Matrix indicator" field defines the diversity multiplexing format. In some embodiments, the diversity multiplexing format is defined by an indicator for indicating a predefined matrix transmission format.

The values in the "Size" column of Table 2 refer to a number of bits used to represent the element of each respective field. It is to be understood that these values are but one example for each respective field. In some embodiments, the number of bits can be greater or less than what is represented in Table 2, for similar reasons to those described above.

The binary values in the "Notes" column of Table 2 for the "Matrix Indicator" and "DIUC" fields are associated with particular selectable options related to those fields. It is to be understood that the binary values are but examples for each field and a particular option can be represented by any appropriate binary value having any reasonable number of bits. In some embodiments, the number of bits for each field can be greater or less than what is represented in Table 2, if there are greater than or less than the number of options identified specifically in Table 2. Furthermore, it is to be understood that the invention is not limited to the particular options identified in Table 2.

Figure 4:
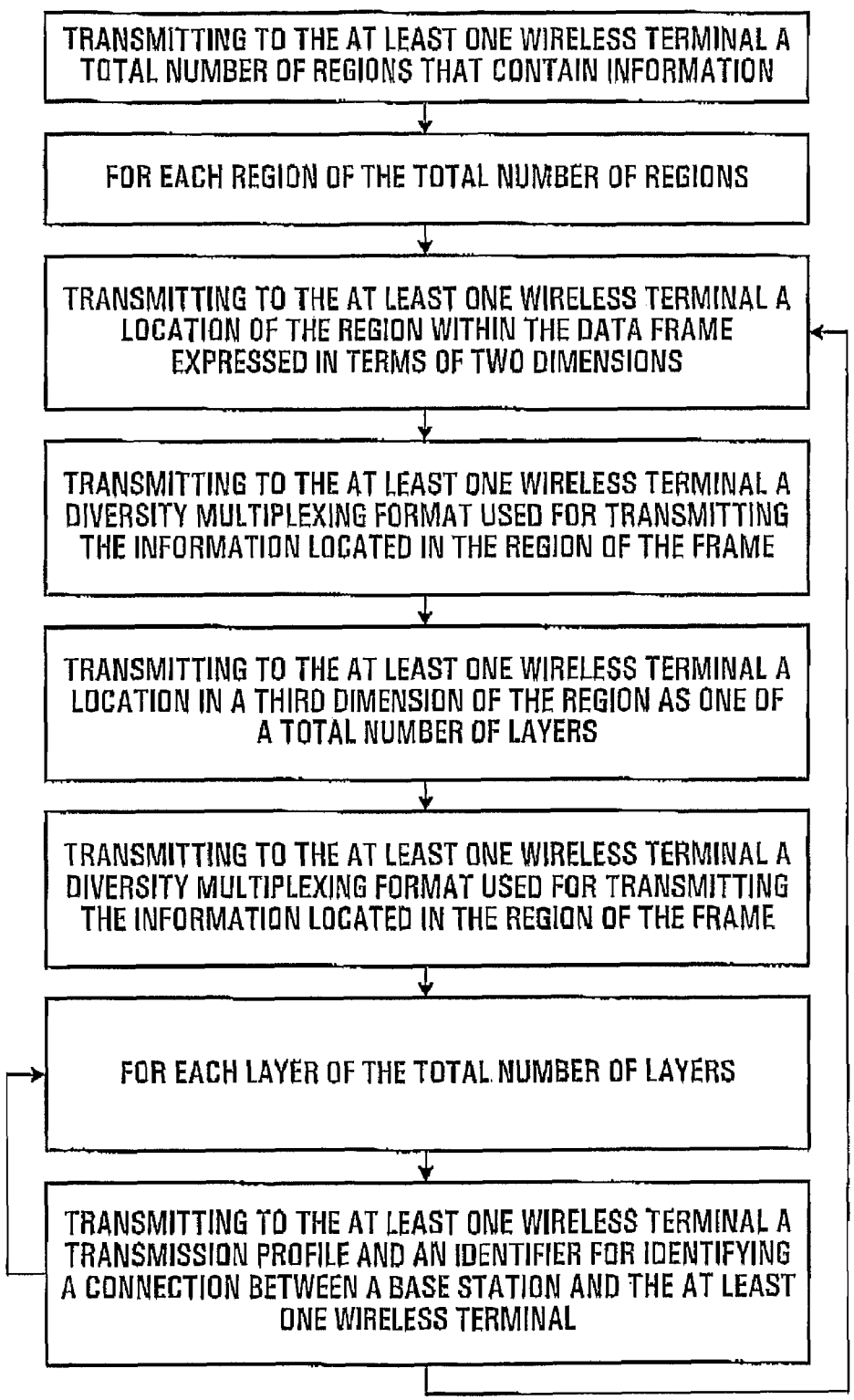
FIG. 4—A flow chart for enabling transmission of downlink information from a base station to a wireless terminal according to another embodiment of the invention.

Generally speaking, the "MIMO DL Basic" IE supports a method as shown in the flow chart of FIG. 4 for enabling downlink transmission in a MIMO enabled OFDM system from a base station to at least one wireless terminal. The method comprises the base Station transmitting to the at least one wireless terminal a total number of regions that contain information, the information in the regions to be subsequently transmitted. The base station transmits to the at least one wireless terminal, for each region of the total number of regions 1) a location of the region within the data frame expressed in terms of two dimensions, 2) a diversity multiplexing format used for transmitting the information located in the region of the frame, 3) a location in a third dimension of the region as one of a total number of layers, and 4) transmitting for each layer of the total number of layers a transmission profile and an identifier for identifying a connection between the base station and the at least one wireless terminal.

UL Burst Assignment to Support Adaptive MIMO Transmission

In a some embodiments, the regions 24 of the UL subframe 19 of FIG. 2 are concatenated in a "head-to-tail" type sequence, that is the regions used by one or more SS for transmission to the BS are allocated in a serial manner. For example, a first region 24 in UL subframe 19 starts at OFDMA symbol M+11, subchannel L+11 and continues until OFDMA symbol M+12, subchannel L+8. A second region 24 in UL subframe 19 starts from the end point of the first region and continues through until OFDMA symbol M+13, subchannel L+4, and so on. The above start and stop points of the various regions are of course only for example and are not meant to limit the invention to regions of these particular sizes.

Whereas the DL mapping IE requires providing a three dimensional mapping to identify the location of information to be transmitted, in some embodiments the UL mapping IE defines a starting point and a duration of the transmitted information for at least the first transmission and the duration of the transmitted information for additional regions.

In some embodiments, a mapping IE is provided for allocating information in the UL subframe 19 of FIG. 2 or a frame similar to FIG. 2, the information being transmitted from the SS to the BS. The UL mapping IE firstly defines a number of regions 24 to be included in the mapping. Then, for each region 24 a diversity multiplexing format is defined for transmitting the information in the region 24. The diversity multiplexing format is chosen depending on the method of transmission of the SS, for example if the SS is capable of dual transmission antenna the diversity multiplexing format is defined, such as by selecting an STC format. If two or more different single transmission antenna SS provide a "virtual" MIMO type functionality, the diversity multiplexing format is indicated as a desirable pattern for a pilot subcarrier pattern to be used for the respective SS transmissions. The duration of each respective region is also defined to ensure all the information in the respective region 24 is transmitted properly.

Table 3 includes an example of a syntax structure for a MIMO UL mapping information element, identified as "MIMO UL Basic" IE, which is used to assign an STC matrix format for each region in a frame to be up link transmitted and assign a PHY profile, in the form of a DIUC, and CID on a per region basis for MIMO operation.

In an UL mapping, a MIMO-enabled BS transmits an uplink interval usage code (UIUC) equal to a predefined value, for example equal to 15, in the "MIMO UL Basic" IE to indicate the MIMO mode of the subsequent uplink allocation to a specific MIMO-enabled SS CID. The MIMO mode indicated in the "MIMO UL Basic" IE only applies to the subsequent uplink allocation until the end of frame.

TABLE 3

MIMO UL Basic IE

| Syntax | Size | Notes |
| --- | --- | --- |
| MIMO UL Basic IE ( ) { | | |
|   Extended UIUC | 4 bits | 0x02 |
|   Length | 4 bits | Length in bytes |
|   Num Assign | | |
|   For (i=0; i< Num Assign; i++ ) { | | |
|     CID | 16 bits | SS basic CID |
|     UIUC | 4 bits | |
|     MIMO Control | 1 bit | For dual transmission capable SS<br>0: STTD; 1: SM<br>For Collaborative SM capable SS<br>0: pilot pattern A; 1: pilot pattern B |
|     Duration | 48 bits | In OFDMA slots |
|   } | | |
| } | | |

The "Num Assign" field indicates the number of assignments or regions in the IE. The UL mapping IE can have more than a single region assignment. For each region assignment a CID and UIUC are defined for transmission of information in that region. Each assignment also includes an additional indication of either a) MIMO mode for a dual antenna transmission SS or b) an identification of a pilot subcarrier pattern for use with a single antenna transmission SS that is used in combination with another single antenna transmission SS (having a different pilot subcarrier pattern) to enable a virtual MIMO mode of the two single antenna transmission SS.

The values in the "Size" column of Table 3 refer to a number of bits used to represent the element of each respective field. It is to be understood that these values are but examples for each respective field. In some embodiments, the number of bits can be greater or less than what is represented in Table 3, for similar reasons to those described above with respect to Tables 1 and 2.

The binary values in the "Notes" column of Table 3 for the "MIMO Control" field is associated with particular selectable options related to that field. It is to be understood that each particular binary value is but examples for each particular option and a particular option can be represented by any appropriate binary value having any reasonable number of bits. In some embodiments, the number of bits can be greater or less than what is represented in Table 3, if there are greater than or less than the number of options identified specifically in Table 3. For example, the "MIMO Control" field may be at least two bits and incorporate all of the four options shown in the "Notes" column of Table 3. Furthermore, it is to be understood that the invention is not limited to the options identified in the table. In some embodiments there may be more and/or different options than the particular options described.

Figure 5:
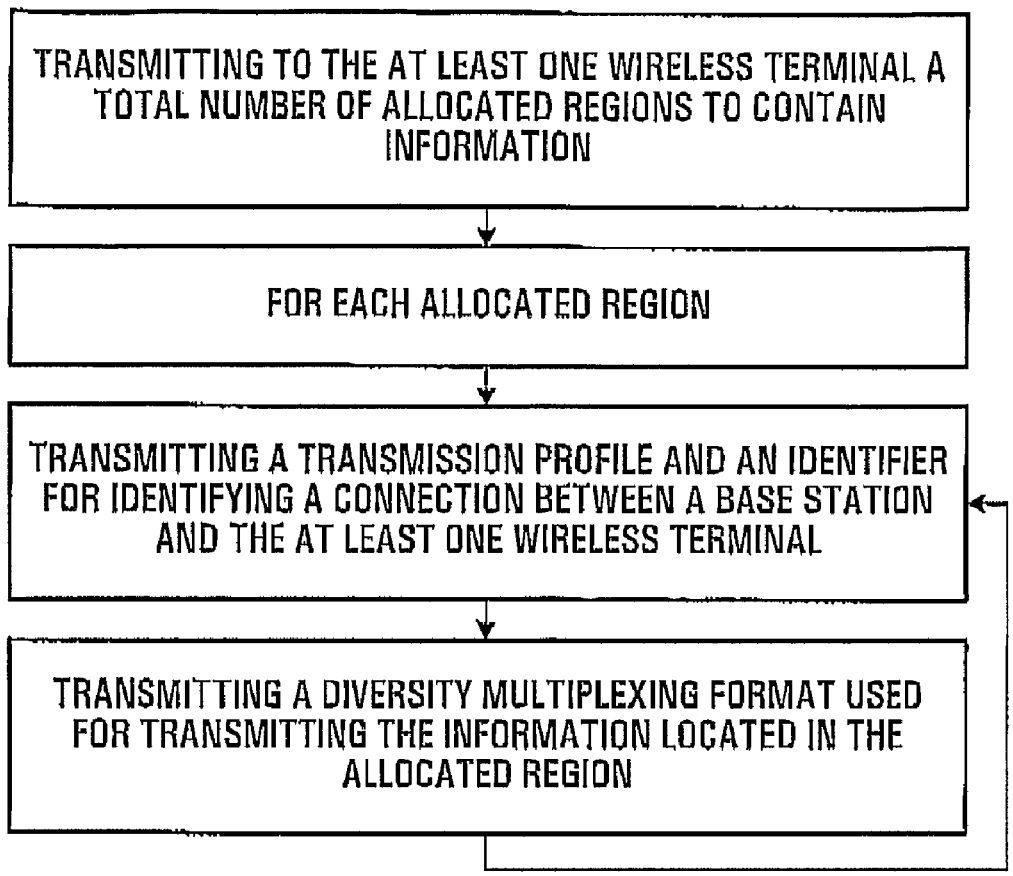
FIG. 5—A flow chart for enabling transmission of uplink information from a base station to a wireless terminal according to one embodiment of the invention.

Generally speaking, the "MIMO UL Basic" IE supports a method as shown in the flow chart of FIG. 5, for enabling uplink transmission in a MIMO enabled OFDM system from a base station to at least one wireless terminals. The method comprising the base station transmitting to the at least one wireless terminal a total number of allocated regions to contain information to be transmitted by the wireless terminal, the regions to be subsequently transmitted. For each allocated region the base station also transmits a diversity multiplexing format used for transmitting the information located in the allocated region.

MIMO Mode/Permutation Mode Feedback

Another embodiment of the invention provides a method for the SS to indicate to the BS the MIMO mode and permutation mode used for uplink transmission of MIMO-enabled OFDMA systems. Slow reporting for fixed applications, as well as fast reporting (per-frame basis) for mobile applications are used in determining MIMO mode and Permutation mode information. As described above, examples of MIMO mode selection are SM and STTD and examples of permutation mode selection are diversity mode, adaptive modulation and coding (AMC) mode and adjacent subcarrier mode.

Region 16 of the DL subframe 17 is known to contain MAC layer message information. MAC message information is known to include some or all of the following: a MAC header, MAC subheaders and a MAC message payload.

Slow Feedback

Different methods can be used to enable the wireless terminal or SS for slow reporting to the BS the MIMO mode and/or permutation mode to be used for uplink transmission to the BS. In a first method, a polling action is initiated by the BS. In some embodiments, this polling action involves a MAC subheader located within a MAC PDU, which is located in the region 16 of the DL subframe 17. The MAC subheader is transmitted by the BS and contains allocation information regarding where in the UL subframe 19, namely a particular feedback channel, the SS is to locate MIMO mode and/or permutation mode setting requested by the BS. The location for feedback reporting from the SS in the UL subframe 19 is one of the fast feedback channels 22 shown in FIG. 2. In some embodiments, the fast feedback channel 22 is a channel quality indication channel (CQICH).

In a second method, the SS sends a periodic reporting of the MIMO mode and/or permutation mode settings to the BS over an allocated fast feedback channel 22. The BS sets a MIMO feedback cycle so that the SS can periodically report MIMO mode/permutation mode information using the fast feedback channel 22. In some embodiments, the fast feedback channel 22 is the CQICH. In the second method, the fast feedback channel 22 is allocated and de-allocated for transmission of the MIMO mode information by the SS using a UL mapping IE 15 originating in the BS.

In some embodiments, in a communication system the SS reports a channel quality indication as well as a MIMO channel coefficient to the BS on a fast feedback channel 22 established between the BS and SS. In some embodiments, the fast feedback channel 22 is used by the SS to indicate to the BS the selection of MIMO mode, i.e. STTD or SM. In some embodiments, the fast feedback channel 22 is used by the SS to indicate to the BS the selection between diversity mode and adaptive modulation and coding (AMC) mode, for example using an adjacent subcarrier permutation mode.

FAST-FEEDBACK Allocation Subheader

Embodiments of the first method described above make use a MAC layer subheader. A format of such a subheader, identified as a "FAST-FEEDBACK" allocation subheader is specified in Table 4. In some embodiments, the "FAST-FEEDBACK" allocation subheader, when used, is the last per-PDU subheader. The support of the "FAST-FEEDBACK" allocation subheader is PHY specification specific.

TABLE 4

FAST-FEEDBACK allocation subheader format

| Syntax | Size | Notes |
| --- | --- | --- |
| FAST-FEEDBACK allocation Subheader { | | |
|   Allocation offset | 6 bits | |
|   Feedback type | 2 bits | 00 - Fast DL measurement<br>01 - Fast MIMO feedback, antenna #0<br>10 - Fast MIMO feedback, antenna #1<br>11 - MIMO mode and diversity/AMC model feedback |
| } | | |

The "Allocation offset" field defines a location of the feedback channel in the frame in the form of an offset, in units of slots, from the beginning of a "FAST-FEEDBACK" uplink bandwidth allocation, of the slot in which the SS servicing the CID appearing in the MAC generic header, sends a "FAST-FEEDBACK" feedback message for the connection associated with the CID value. With regard to FIG. 2, the beginning of the "FAST-FEEDBACK" uplink bandwidth allocation would be the beginning of the first fast feedback channel 22 and the offset would correspond to the location of a particular fast feedback channel allocated for the SS to respond to the BS polling request. The allocation applies to the UL subframe of the next frame.

The "Feedback type" field defines a type of feedback information the BS is requesting from the SS. In some embodiments, the indications used to identify different types of requested information include an indication for requesting MIMO mode and permutation mode settings.

The values in the "Size" column of Table 4 refer to a number of bits used to represent the element of each respective field. For example the 6 bits of the "Allocation offset" field correspond to a range of values from 0 to 63. It is to be understood that these values are but examples for each respective field. In some embodiments, the number of bits can be greater or less than what is represented in Table 4, for similar reasons to those described above.

The binary values in the "Notes" column of Table 4 for the "Feedback type" field is associated with particular selectable options related to that field. It is to be understood that each particular binary value is but examples for each particular option and a particular option can be represented by any appropriate binary value having any reasonable number of bits, in some embodiments, the number of bits can be greater or less than what is represented in Table 4, if there are greater than or less than the number of options identified specifically in Table 4. Furthermore, it is to be understood that the invention is not limited to the options identified in the table. In some embodiments there may be more and/or different options than the particular options shown.

Figure 6:
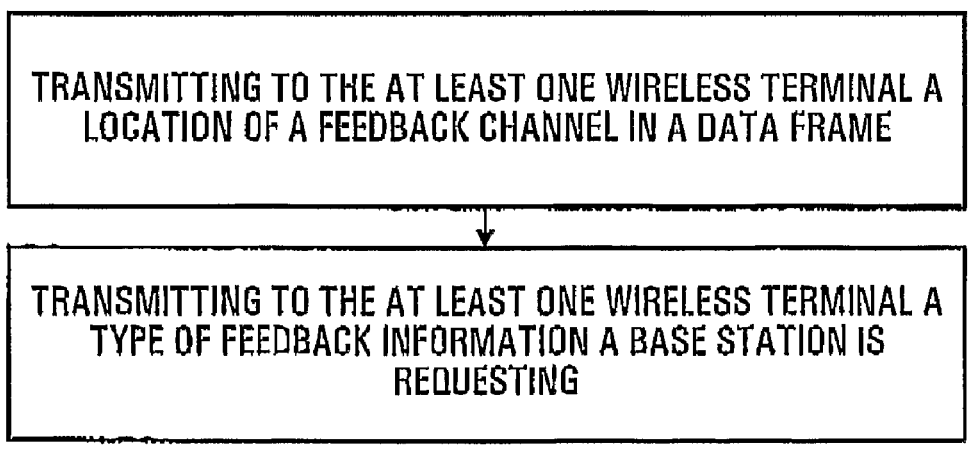
FIG. 6—A flow chart for allocating a feedback channel between a base station to a wireless terminal according to an embodiment of the invention.

Generally speaking, the "FAST-FEEDBACK" allocation subheader supports a method as shown in the flow chart of FIG. 6, for allocating a feedback channel between a base station and at least one wireless terminal in a data frame, wherein the base station polls the at least one wireless terminal. The method comprising a base station transmitting to at least one wireless terminal a location of the feedback channel in the frame and a type of feedback information the base station is requesting.

As described above slow MIMO mode switching can be implemented by the BS polling the SS for the intention of the SS in regard to the MIMO mode and/or permutation mode. In the example of Table 4, the BS setting the "Feedback type" field of the "FAST-FEEDBACK" subheader to a particular value, for example "11" is used to request an indication of MIMO mode and permutation mode to be used by the SS. The polling interval is implementation dependent. Once the SS receives such a "FAST-FEEDBACK" sub-header, the SS sends indication of the MIMO mode and permutation mode on the assigned fast feedback channel. Table 5 shows examples of binary values and corresponding mode descriptions for encoding of payload bits of the fast feedback channel.

TABLE 5

Encoding of payload bits when "Feedback type" = '11' in "FAST-FEEDBACK" subheader.

| Value | Description |
|---|---|
| 0000 | STTD and Diversity |
| 0001 | STTD and AMC |
| 0010 | SM and Diversity |
| 0011 | SM and AMC |
| 0100-1111 | reserved |

The values in the "Value" column of Table 5 refer to a particular binary number, including in this case four bits, to correspond to a particular encoding scheme. It is to be understood that these values are but examples for each encoding scheme and an encoding scheme could be represented by any appropriate binary value having any reasonable number of bits. In some embodiments, the number of bits can be greater or less than what is represented in Table 5, for similar reasons to those described above.

Fast Feedback

Fast feedback reporting is enable by embodiments of the invention in which an SS has an allocated CQICH. A method for providing CQICH allocation involving an IE in the DL mapping component 12 of FIG. 2 is described in more detail below. When the CQICH is allocated for a particular SS, a portion of the CQICH payload can be used for providing the MIMO mode and permutation mode selection on a per-frame basis. For example, one of a total number of bits in a CQICH payload is used to provide fast mode selection feedback. A typical CQICH has 4 bits in the payload, but it is understood that the CQICH payload may have greater than or less than this number of bits.

In an example wherein the payload has 4 bits and a particular permutation mode is currently selected, for example Diversity mode, the 4 bits of CQICH payload are defined as follows; the most significant 3 bits are used to indicate a CQI index or an equivalent DIUC and the least significant bit is used to indicate the MIMO mode. A specific encoding of these 3 bits is reserved as an indication of switching permutation modes, for example from Diversity mode to AMC mode.

In an example of operation of the above described fast reporting method, after the BS detects the switching indication, the BS can immediately assign a UL resource to the SS so that the SS can send a ranging request (RNG_REQ) message which may include detailed channel quality of up to 4 or 8 AMC bands. In this message, for each selected AMC band, the antenna index is included for a MIMO-enabled system. The BS then sends a ranging response (RNG_RSP) message as an acknowledgement/grant. In this example, the current RNG_REQ message and RNG_RSP message are modified for this purpose. After a delay (specified either in a downlink channel description (DCD) message or in RNG_RSP message), the SS starts to send AMC mode CQICH payload. The differential C/I is sent at the rate of 4 AMC bands/frame. More generally, the messages sent between the SS and BS are not specifically the RNG_REQ and RNG_RSP formats described above, but are any type of message that can be used to request desired information and subsequently acknowledge the request.

Continuing with the example of a CQICH payload having 4 bits, another fast reporting method defines the use of the 4 bits as follows: the most significant 3 bits are used to report a differential CQI of the selected AMC bands and the least significant bit is used to indicate the MIMO mode (1=STTD; 0=SM) when sent on odd numbered frames, and to indicate switching between permutation modes, for example from AMC mode to Diversity mode, when sent on even numbered frames. In some embodiments, indication of switching permutation modes is performed by setting the bit to 1. The MIMO mode indication bit is essentially being shared in a time division multiplexing fashion between MIMO mode reporting and permutation mode reporting. In some embodiments after the BS detects this indication, the BS should send a unsolicited message, one example being a RNG_RSP message, as an acknowledgement that indicates the delay for the SS to start to send Diversity mode CQICH payload.

In some embodiments, the reporting of the MIMO mode and/or permutation mode setting triggers the base station to assign additional uplink resources to enable the wireless terminal to send additional information regarding the MIMO mode and/or permutation mode setting.

Dynamic CQICH Allocation and the Use of CQICH ID for DL Burst Allocation

Embodiments of the slow feedback reporting method and the fast feedback reporting method described above make use of CQICH. The number of available CQICHs on the uplink is dependent on an amount of uplink sub-carriers and OFDM symbols allocated for the CQICHs. Fast CQI feedback represents non-negligible overhead on the uplink and therefore the CQICH resource in some embodiments is dynamically allocated and de-allocated to different SS as appropriate. The dynamic allocation and de-allocation to different SS should be done without incurring too much downlink signaling overhead. In some embodiments, the option of allocating/de-allocating the CQICH on a multiple-burst basis is used rather than on a per-burst basis.

A new UL mapping IE, identified as "CQICH allocation MAP" IE, is provided to enable the BS to dynamically allocate or de-allocate a CQICH to a given SS.

Table 6 defines the syntax structure of an embodiment of a CQICH allocation mapping information element. Once allocated, the SS transmits channel quality information on the assigned CQICH which is transmitted on every subsequent frame, until the SS receives a further "CQICH allocation MAP" IE to de-allocate the assigned CQICH.

TABLE 6

| CQICH allocation MAP IE( ) | | |
|---|---|---|
| Syntax | Size | Notes |
| CQICH allocation MAP IE ( ) { | | |
|   Extended UIUC | 4 bits | 0x03 |
|   Length | 8 bits | Length in bytes of following fields |
|   CQICH indicator | 1 bit | If the indicator == 1, the "CQICH allocation MAP" IE follows. If the indicator == 0, no "CQICH allocation MAP" IE is present for the SS. |
|   if (CQICH indicator) == 1 { | | |
|     CQICH ID | Variable | Index to uniquely identify the CQICH resource assigned to the SS. The size of this field is dependent on system parameter defined in DCD. |
|     Allocation offset | 5 bits | Index to the channel in a frame in which the CQI report should be transmitted by the SS. |
|     Period (=p) | 2 bits | A CQI feedback is transmitted on the CQI channels indexed by the (CQI Channel Index) by the SS in every 2p frames. |
|     Frame offset | 3 bits | The SS starts reporting at the frame of which the number has the same 3 least significant bits (LSB) as the specified frame offset. If the current frame is specified, the SS should start reporting in 8 frames |
|     Duration (=d) | 3 bits | A CQI feedback is transmitted on the CQI channels indexed by the (CQI Channel Index) by the SS for $10 \times 2^d$ frames. If d == 0, the CQI-CH is deallocated. If d == 111, the SS should report until the BS command for the SS to stop. |
|     MIMO permutation feedback cycle | 2 bits | 0b00 = No MIMO and permutation mode feedback<br>0b01 = The MIMO and permutation mode indication shall be transmitted on the CQICH indexed by the CQICH_ID every 4 frames. The first indication is sent on the $8^{th}$ CQICH frame.<br>0b10 = The MIMO and permutation mode indication shall be transmitted on the CQICH indexed by the CQICH_ID every 8 frames. The first indication is sent on the $8^{th}$ CQICH frame.<br>0b110 = The MIMO and permutation mode indication shall be transmitted on the CQICH indexed by the CQICH_ID every 16 frames. The first indication is sent on the $16^{th}$ CQICH frame. |
|     Padding | variable | The padding bits are used to ensure the IE size is an integer number of bits. |
|   } | | |
| } | | |

The "CQICH indicator" field provides indication whether the "CQICH allocation MAP" IE follows.

The "CQICH ID" field uniquely identifies a fast feedback channel 22 on which an SS can transmit feedback reporting information with a designated value. With this allocation, a one-to-one relationship is established between the CQICH ID and the SS. As indicated in the embodiment enabled by Table 6, the size of the field is defined by the Downlink Channel Descriptor (DCD) message. The DCD message contains message encodings that further define aspects of the downlink transmission. For example in addition to defining a size of the CQICH_ID field, other DCD messages relate to identifying the BS ID, the downlink center channel frequency, the frame duration code and the number of frames used to contain the DCD message.

The "Allocation offset", "Frame offset", "period" and "Duration" fields provide positional and timing information in the frame pertaining to the CQICH being allocated or de-allocated.

The "MIMO permutation feedback cycle" field provides an indication if there is no MIMO and permutation mode feedback or for a particular MIMO and permutation mode feedback indication a given periodic frame rate.

In some embodiments, the MIMO and/or permutation mode feedback indications are provided by different payload bit encoding types. For example, the encoding types identified in Table 5 above.

The values in the "Size" column of Table 6 refer to a number of bits used to represent the element of each respective field. It is to be understood that these values are but examples for each respective field. In some embodiments, the number of bits can be greater or less than what is represented in Table 6, for similar reasons to those described above.

Figure 7:
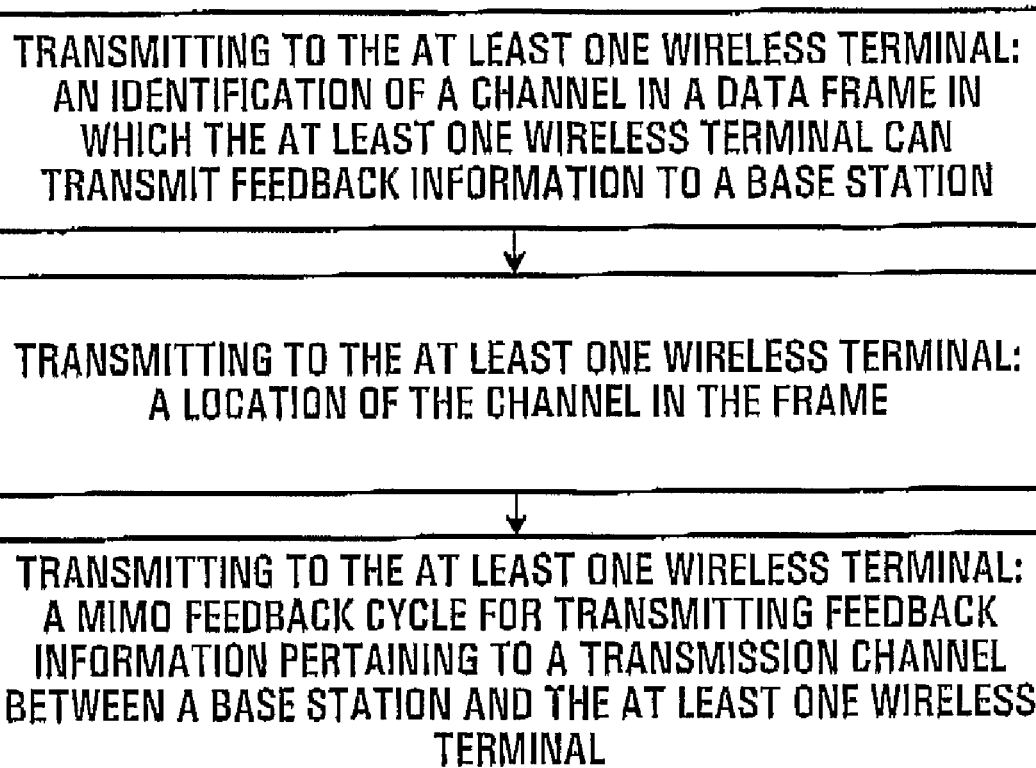
FIG. 7—A flow chart for allocating a feedback channel between a base station to a wireless terminal according to another embodiment of the invention.

Generally speaking, the "CQICH allocation MAP" IE supports a method as shown in the flow chart of FIG. 7, for dynamically allocating a channel quality indication channel to a wireless terminal in a MIMO-OFDM system. The method comprises the base station transmitting to the at least one wireless terminal 1) an identification of a channel in a data frame in which the wireless terminal can transmit feedback information to a base station, 2) a location of the channel in the frame, and 3) a feedback cycle for transmitting feedback information pertaining to a transmission channel between a base station and the wireless terminal.

MIMO DL Enhanced IE Format

When the SS is allocated a CQICH, as described above there is a one-to-one mapping between the SS and the CQICH assigned. Advantageously thereafter, in some embodiments when allocating a DL burst to the SS a basic CID commonly 16 bits in length can be replaced by a "CQICH ID" which is smaller in size. This replacement reduces DL signaling overhead. The replacement involves replacing the "CID" field identified in the previously described "MIMO DL Basic" IE with a "CQICH ID" field to create an alternative DL mapping IE.

Table 7 defines the syntax structure of the alternative embodiment of the MIMO DL mapping information element, identified as "MIMO DL Enhanced" IE. In the alternative embodiment the CQICH ID identifier is used instead of the CID identifier in assigning a DL burst to the SS.

In the alternative DL mapping, a MIMO-enabled BS transmits a DIUC equal to a predefined value, for example equal to 15 within the "MIMO DL Enhanced" IE to indicate the MIMO mode of the subsequent downlink allocation to a specific MIMO-enabled SS identified by the CQICH ID previously assigned to the SS. In some embodiments the MIMO mode indicated in the "MIMO DL Enhanced" IE only applies to the subsequent downlink allocation until the end of frame.

TABLE 7

MIMO DL Enhanced IE

| Syntax | Size | Notes |
| --- | --- | --- |
| MIMO DL Enhanced IE ( ) { | | |
|   Extended DIUC | 4 bits | 0x06 |
|   Length | 8 bits | Length in bytes |
|   Num_Region | 4 bits | |
|   for ( i = 0; i< Num Region; i++) { | | |
|     OFDMA Symbol offset | 10 bits | |
|     Subchannel offset | 5 bits | |
|     Boosting | 3 bits | |
|     No. OFDMA Symbols | 9 bits | |
|     No. subchannels | 5 bits | |
|     Num_layer | 2 bits | |
|     for (j = 0; j< Num layer; j++) { | | |
|       if (INC CID == 1) { | | |
|         CQICH ID | 8 bits | |
|       } | | |
|       Layer index | 2 bits | |
|       DIUC | 4 bits | 0-11 burst profiles |
|     } | | |
|   } | | |
| } | | |

The values in the "Size" column of Table 7 refer to a number of bits used to represent the element of each respective field. It is to be understood that these values are but one example for each respective field. In some embodiments, the number of bits used can be greater or less than what is represented in Table 7, for similar reasons to those described above.

It is to be understood that Tables 1, 2, 3, 4, 6 and 7 represent examples of practical implementations of the methods provided for mapping downlink and uplink regions in the PHY layer and methods provided for or related to slow and fast feedback reporting between the BS and one or more SS. In other embodiments of practical implementations of these methods, there may be a greater or lesser number of fields. Additional fields may be desired for providing additional information. Fewer fields may be used to reduce transmission overhead, if the reduction of the fields does not substantially vary the scope of the invention as describe herein.

Two Step Resource Allocation

Another aspect provided by embodiments of the invention is a method that aids in the reduction of battery consumption of the wireless terminal or SS. In wireless access networks, the concept of a high speed channel (fat pipe) shared by multiple active terminals is widely accepted. As the channel has a high capacity, multiple terminals can be scheduled in a given scheduling interval. The number of terminals scheduled may be large if a traffic pattern presents a very bursty nature. In current systems, at each scheduling instant, the network sends resource assignment information either through a signaling channel or through a message. The resource assignment information usually includes multiple assignments since usually multiple terminals, traffic can be scheduled in one scheduling interval. Each resource assignment of a SS includes an ID of the SS and assignment details, such as, resource allocation description and the physical layer parameters, for example HARQ related parameters, modulation and code index and MIMO related parameters. Thus, if the traffic presents high burstyness and with more advanced PHY techniques, the resource assignment information may be quite lengthy and the number of bits associated with the assignment details will be much higher than the number of bits associated with the IDs. In order to check whether traffic is scheduled for a terminal, the terminal has to decode the entire resource assignment information. This is not an efficient method.

Embodiments of the invention provide separating the entire resource assignment information into two parts. A first part includes IDs only, for example through an Alert message and a second part includes the assignment details, for example an Assignment message. The two parts are separately decoded and transmitted.

In operation, an SS decodes the first part. If the SS ID is present then the terminal continues to decode the second part and attempts to find assignment details based on an order of the presence of the SS ID in the first part. It the SS ID is not included in the first part, the terminal stops any further process in this scheduling interval.

In this way the battery consumption of a terminal can be reduced as the SS does not decode information that is not relevant to the SS.

Enhancement of Idle Mode Operation—Efficient Paging Procedure

A random access resource in used in cellular systems today that serves the dual purpose of carrying uplink resource requests as well as paging responses from a terminal or SS. In such a design, both access requests and paging responses are treated similarly. A terminal has to perform a lengthy random access procedure (back off) when the terminal either responds to a page or initiates a UL transmission.

A situation where a terminal initiates a UL transmission by using random access is itself a random event. However, the event where a terminal sends a response to a page is a purely deterministic event and can be predicated. A lengthy random access procedure can be avoided if a terminal is trying to respond to a page from the BS since the BS knows that the paged terminal will need a UL resource to send a response to the page at the time when a BS sends the page.

In operation, when a BS is paging a terminal, the BS assigns a dedicated UL resource for a certain period of time (response window) to the paged terminal for the terminal to send a paging response quickly. The terminal sends a paging response by using the assigned UL resource. The dedicated resource will be de-allocated earlier if the BS receives the response before the end of the window. If a terminal does not successfully send a response during the response window, then the terminal performs to normal random access procedure.

Numerous modifications and variations of the present invention are possible in light of the above teachings. It is therefore to be understood that within the scope of the appended claims, the invention may be practiced otherwise than as specifically described herein. START HERE

The invention claimed is:

1. A method for enabling downlink transmission in a MIMO enabled OFDM system from a base station to at least one wireless terminal, the method comprising:
   establishing a three dimensional frame, the three dimensional frame including:
      a first dimension including a plurality of rows, at least one of the plurality of rows designated by a subchannel;
      a second dimension including a plurality of columns, at least one of the plurality of columns designated by an OFDMA symbol;
      a third dimension including a plurality of layers;
   the base station transmitting to the at least one wireless terminal:
      a location of a region within the three dimensional frame expressed by an OFDMA symbol offset, a subchannel offset, and at least one of the plurality of layers;
   the base station transmitting to the at least one wireless terminal for each of the plurality of layers:
      a transmission profile; and
      an identifier for identifying a connection between the base station and the at least one wireless terminal.

2. The method of claim 1, wherein the location of the region within the three dimensional frame is expressed by a number of OFDMA symbols the region occupies, and a number of subchannels the region occupies, the base station further transmitting to the at least one wireless terminal, for each region:
   a diversity multiplexing format used for transmitting information located in the region of the data frame.

3. The method of claim 1, wherein the transmission profile is a downlink interval usage code (DIUC).

4. The method according to claim 1, wherein the diversity multiplexing format is defined by an indicator for indicating a predefined matrix transmission format.

5. The method of claim 1, wherein the identifier is a connection identification (CID) for the connection between the base station and the at least one wireless terminal.

6. The method of claim 1, wherein the identifier is a value uniquely allocated to a single wireless terminal for a limited duration of time.

7. The method of claim 6, wherein the identifier is a channel quality identification channel (CQICH) identifier.

8. The method of claim 1, wherein the transmissions are transmitted in a downlink information element of the three dimensional frame, the three dimensional frame transmitted from the base station to the at least one wireless terminal.

9. The method of claim 1, wherein the transmissions are transmitted in accordance with a downlink information element of the three dimensional frame, the downlink information element comprising a data field for each respective transmission by the base station.

10. The method of claim 9, wherein each data field is occupied by one or more bits.

11. The method of claim 8, the downlink information element comprising the following format:

| Syntax | Size | Notes |
| --- | --- | --- |
| MIMO DL Basic IE ( ) { | | |
| Extended DIUC | 4 bits | 0x05 |
| Length | 8 bits | Length in bytes |
| Num Region | 4 bits | |
| for ( i = 0; i< Num Region; i++) { | | |
| OFDMA Symbol offset | 10 bits | |
| Subchannel offset | 5 bits | |
| Boosting | 3 bits | |
| No. OFDMA Symbols | 9 bits | |
| No. subchannels | 5 bits | |
| Matrix indicator | 3 bits | STC matrix |
| | | 000 = Matrix A |
| | | 001 = Matrix B |
| | | 010 = Matrix C |
| | | 011 = Matrix D |
| | | 100 = Matrix E |
| | | 101-111 = Reserved |
| Num layer | 2 bits | |
| for (j = 0; j< Num layer; j++)    { | | |
| if (INC CID == 1) { | | |
| CID | 16 bits | |
| } | | |
| Layer index | 2 bits | |
| DIUC | 4 bits | 0-11 burst profiles |
| } | | |
| }. | | |

12. The method of claim 8, the downlink information element comprising the following format:

| Syntax | Size | Notes |
| --- | --- | --- |
| MIMO DL Enhanced IE ( ) { | | |
| Extended DIUC | 4 bits | 0x06 |
| Length | 8 bits | Length in bytes |
| Num_Region | 4 bits | |
| for ( i = 0; i< Num Region; i++) { | | |
| OFDMA Symbol offset | 10 bits | |
| Subchannel offset | 5 bits | |
| Boosting | 3 bits | |
| No. OFDMA Symbols | 9 bits | |
| No. subchannels | 5 bits | |
| Num_layer | 2 bits | |
| for (j = 0; j< Num layer; j++)    { | | |
| if (INC CID == 1) { | | |
| CQICH ID | 8 bits | |
| } | | |
| Layer index | 2 bits | |
| DIUC | 4 bits | 0-11 burst profiles |
| } | | |
| }. | | |

13. A method for enabling uplink transmission in a MIMO enabled OFDM system from at least one wireless terminal to a base station, the method comprising:
   establishing a three dimensional frame, the three dimensional frame including:
      a first dimension including a plurality of rows, at least one of the plurality of rows designated by a subchannel;

a second dimension including a plurality of columns, at least one of the plurality of columns designated by an OFDMA symbol;

a third dimension including a plurality of layers;

the at least one wireless terminal receiving from the base station a location of a region within the three dimensional frame expressed by an OFDMA symbol offset, a subchannel offset, and at least one of the plurality of layers;

the at least one wireless terminal receiving from the base station for each of the plurality of layers:

a transmission profile and an identifier for identifying a connection between the base station and the at least one wireless terminal.

14. The method of claim 13, wherein the at least one wireless terminal further receiving from the base station for each of the plurality of layers a diversity multiplexing format used for transmitting the information located in the region, the diversity multiplexing format is defined by an indicator for indicating a predefined matrix transmission format when the at least one wireless terminal has at least two transmit antennas.

15. The method of claim 13, wherein the diversity multiplexing format is defined by an indicator for indicating a first subcarrier pilot pattern of the at least one wireless terminal having a single transmit antenna, the at least one wireless terminal being used in combination with a second wireless terminal having a single transmit antenna and having a second subcarrier pilot pattern, the at least one wireless terminals and the second wireless terminal providing a collaborative spatial multiplexing diversity.

16. The method of claim 13, wherein the transmissions are transmitted in an uplink information element of the three dimensional frame, the three dimensional frame transmitted from the base station to the at least one wireless terminal.

17. The method of claim 13, wherein the transmissions are transmitted in accordance with an uplink information element of the three dimensional frame, the uplink information element comprised of a data field for each respective transmission by the base station.

18. The method of claim 17, wherein each data field is occupied by one or more bits.

19. The method of claim 16, the uplink information element comprising the following format:

| Syntax | Size | Notes |
|---|---|---|
| MIMO UL Basic IE ( ) { | | |
|   Extended UIUC | 4 bits | 0x02 |
|   Length | 4 bits | Length in bytes |
|   Num Assign | | |
|   For (i=0; i< Num Assign; i++ ) | | |
|   { | | |
|     CID | 16 bits | SS basic CID |
|     MIMO Control | 1 bit | For dual transmission capable SS |
| | | 0: STTD; 1: SM |
| | | For Collaborative SM capable SS |
| | | 0: pilot pattern A; 1: pilot pattern B |
|     Duration | 48 bits | In OFDMA slots |
|   } | | |
| }. | | |

20. The method of claim 1, wherein a transmitter in the MIMO enabled OFDM communications system is adapted to perform the method of claim 1.

21. The method of claim 13, wherein the transmission profile is a uplink interval usage code (UIUC).

22. The method of claim 13, wherein the identifier is a connection identification (CID) for the connection between the base station and the at least one wireless terminal.

* * * * *

UNITED STATES PATENT AND TRADEMARK OFFICE
CERTIFICATE OF CORRECTION

PATENT NO. : 7,630,356 B2  Page 1 of 1
APPLICATION NO. : 11/547561
DATED : December 8, 2009
INVENTOR(S) : Hang Zhang et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 492 days.

Column 22, line 13, Claim 11, replace "Basic" with --Enhanced--.

Column 22, line 22, Claim 11, replace "STC" with --STX--.

Column 22, line 43, Claim 12, replace "Basic" with --Enhanced--.

Column 24, line 13, Claim 19, replace "4 bits" with --8 bits--. (2nd occurrence)

Signed and Sealed this

Tenth Day of August, 2010

David J. Kappos
*Director of the United States Patent and Trademark Office*